United States Patent
Ishiyama et al.

(10) Patent No.: US 10,156,389 B2
(45) Date of Patent: Dec. 18, 2018

(54) REFRIGERATION CYCLE APPARATUS WITH OIL SEPARATOR SWITCHING VALVE

(71) Applicant: Mitsubishi Electric Corporation, Tokyo (JP)

(72) Inventors: Hiroki Ishiyama, Tokyo (JP); Yohei Kato, Tokyo (JP); Satoru Yanachi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/551,156

(22) PCT Filed: Mar. 27, 2015

(86) PCT No.: PCT/JP2015/059584
§ 371 (c)(1),
(2) Date: Aug. 15, 2017

(87) PCT Pub. No.: WO2016/157282
PCT Pub. Date: Oct. 6, 2016

(65) Prior Publication Data
US 2018/0023868 A1  Jan. 25, 2018

(51) Int. Cl.
F25B 49/02 (2006.01)
F25B 31/00 (2006.01)
F25B 43/02 (2006.01)
F25B 13/00 (2006.01)

(52) U.S. Cl.
CPC ............ *F25B 31/004* (2013.01); *F25B 13/00* (2013.01); *F25B 31/002* (2013.01); *F25B 43/02* (2013.01);
(Continued)

(58) Field of Classification Search
CPC ............... F25B 31/004; F25B 2400/23; F25B 2500/16; F25B 2600/25; F25B 2600/2501;
(Continued)

(56) References Cited

U.S. PATENT DOCUMENTS 5,368,446 A * 11/1994 Rode ................... F04C 18/0207
310/68 C
8,353,180 B2 * 1/2013 Okamoto .............. F25B 31/004
62/470
(Continued)

FOREIGN PATENT DOCUMENTS

JP 2001-074319 A 3/2001
JP 2001-141323 A 5/2001
(Continued)

OTHER PUBLICATIONS

JP 2014-85104 (English Translation).*
(Continued)

*Primary Examiner* — Jonathan Bradford
(74) *Attorney, Agent, or Firm* — Posz Law Group, PLC

(57) ABSTRACT

A refrigeration cycle apparatus includes: a refrigerant circuit including a compressor, a condenser, an expansion device, and an evaporator; a first detector provided to the compressor, and configured to detect a temperature of the compressor; a second detector provided between the compressor and the expansion device in the refrigerant circuit, and configured to detect one of a temperature of refrigerant and a pressure of the refrigerant; and a controller configured to control at least one of frequency of the compressor and an opening degree of the expansion device based on the temperature detected by the first detector and one of the temperature and the pressure detected by the second detector so as to maintain a concentration of a refrigerating machine oil dissolved in the refrigerant in the compressor and an oil level of the refrigerating machine oil in the compressor within respective predetermined ranges.

7 Claims, 12 Drawing Sheets

(52) U.S. Cl.
CPC ...... *F25B 49/02* (2013.01); *F25B 2313/0312* (2013.01); *F25B 2313/0313* (2013.01); *F25B 2313/0314* (2013.01); *F25B 2313/0315* (2013.01); *F25B 2400/23* (2013.01); *F25B 2500/16* (2013.01); *F25B 2500/19* (2013.01); *F25B 2600/0253* (2013.01); *F25B 2600/2507* (2013.01); *F25B 2600/2513* (2013.01); *F25B 2700/03* (2013.01); *F25B 2700/195* (2013.01); *F25B 2700/2115* (2013.01); *F25B 2700/21152* (2013.01)

(58) Field of Classification Search
CPC ...... F25B 2600/2507; F25B 2600/2515; F25B 2700/03; F25B 43/02
See application file for complete search history.

(56) References Cited

U.S. PATENT DOCUMENTS

2006/0032255 A1* 2/2006 Hwang ................ F25B 49/025
62/228.1

2015/0064040 A1* 3/2015 Brostrom .............. F04C 29/021
418/84

FOREIGN PATENT DOCUMENTS

| JP | 2002-333220 A | 11/2002 |
| JP | 2004-085035 A | 3/2004 |
| JP | 2010-038503 A | 2/2010 |
| JP | 2011-169475 A | 9/2011 |
| JP | 2013-139896 A | 7/2013 |
| JP | 2014-020661 A | 2/2014 |
| JP | 2015-038406 A | 2/2015 |
| JP | 2015-038407 A | 2/2015 |

OTHER PUBLICATIONS

International Search Report of the International Searching Authority dated Jun. 2, 2015 for the corresponding international application No. PCT/JP2015/059584 (and English translation).

Office Action dated May 22, 2018 issued in corresponding JP patent application No. 2017-508818 (and English translation).

* cited by examiner

REFRIGERATION CYCLE APPARATUS WITH OIL SEPARATOR SWITCHING VALVE

CROSS REFERENCE TO RELATED APPLICATION

This application is a U.S. national stage application of International Application No. PCT/JP2015/059584, filed on Mar. 27, 2015, the contents of which are incorporated herein by reference.

TECHNICAL FIELD

The present invention relates to a refrigeration cycle apparatus, and particularly relates to a refrigeration cycle apparatus that secures the concentration of refrigerating machine oil in a compressor and the oil level of the refrigerating machine oil in the compressor.

BACKGROUND

A refrigeration cycle apparatus includes, for example, a compressor that compresses and discharges refrigerant, a heat exchanger serving as a radiator (a condenser) that transfers heat from the refrigerant, and a heat exchanger serving as an expansion device that reduces the pressure of the refrigerant and an evaporator that causes the refrigerant to evaporate.

The compressor includes, for example, a sealed container defining the exterior, a motor mechanism including a stator fixed in the sealed container and a rotor, and a compression mechanism that is driven by the motor mechanism and compresses the refrigerant.

If the compressor is of the rotary type, a piston slides on a cylinder of the compression mechanism of the compressor when compressing the refrigerant. The sliding of the cylinder and the piston causes wear of the both parts, leading to a reduction in reliability of the compressor. That is, since the compressor includes various sliding parts, the sliding parts are worn, leading to a reduction in reliability. To avoid this, refrigerating machine oil serving as a lubricant is sealed in the sealed container of the compressor. The refrigerating machine oil flows between the cylinder and the piston, together with the refrigerant, and lubricates the cylinder and the piston.

In the sealed container, the refrigerating machine oil is mixed in the refrigerant. Therefore, when the amount of liquid refrigerant in the sealed container increases (the liquid back amount increases), the concentration of the refrigerating machine oil in the sealed container decreases, which may result in poor lubrication. In view of the above, there has been proposed a refrigeration cycle apparatus (a refrigerating machine) that temporarily stops the compressor when the liquid back amount increases (see, for example, Patent Literature 1).

PATENT LITERATURE

Patent Literature 1: Japanese Unexamined Patent Application Publication No. 2011-169475

For example, even when the concentration of the refrigerating machine oil is maintained, if the position of the oil level of the refrigerating machine oil in the compressor is low, the compression mechanism may be poorly lubricated. If the oil level position is extremely low, for example, the amount of refrigerating machine oil in the compressor is small, the refrigerating machine oil that lubricates the compression mechanism is considered to be exhausted.

Further, for example, even when the oil level position is high, if the oil level is increased due to an increase in the amount of liquid refrigerant in the compressor caused by liquid back or other factors, the concentration of the refrigerating machine oil is low. That is, even when the oil level is high, if the concentration of the refrigerating machine oil is low, the compression mechanism is poorly lubricated.

In this manner, if the concentration and the oil level of the refrigerating machine oil are not within their appropriate ranges, the compression mechanism is poorly lubricated, so that the reliability of the compressor is reduced.

SUMMARY

The present invention has been made to overcome the above problems, and to provide a refrigeration cycle apparatus capable of reducing a decrease in reliability of a compressor due to poor lubrication of a compression mechanism.

A refrigeration cycle apparatus of one embodiment of the present invention includes: a refrigerant circuit including a compressor, a condenser, an expansion device, and an evaporator; a first detector provided to the compressor, and configured to detect a temperature of the compressor; a second detector provided between the compressor and the expansion device in the refrigerant circuit, and configured to detect one of a temperature of refrigerant and a pressure of the refrigerant; and a controller configured to control at least one of frequency of the compressor and an opening degree of the expansion device based on the temperature detected by the first detector and one of the temperature and the pressure detected by the second detector so as to maintain a concentration of a refrigerating machine oil dissolved in the refrigerant in the compressor and an oil level of the refrigerating machine oil in the compressor within respective predetermined ranges.

With a refrigeration cycle apparatus of one embodiment of the present invention, since the above configuration is provided, it is possible to reduce a decrease in reliability of a compressor due to poor lubrication of a compressor mechanism.

DETAILED DESCRIPTION

Figure 1:
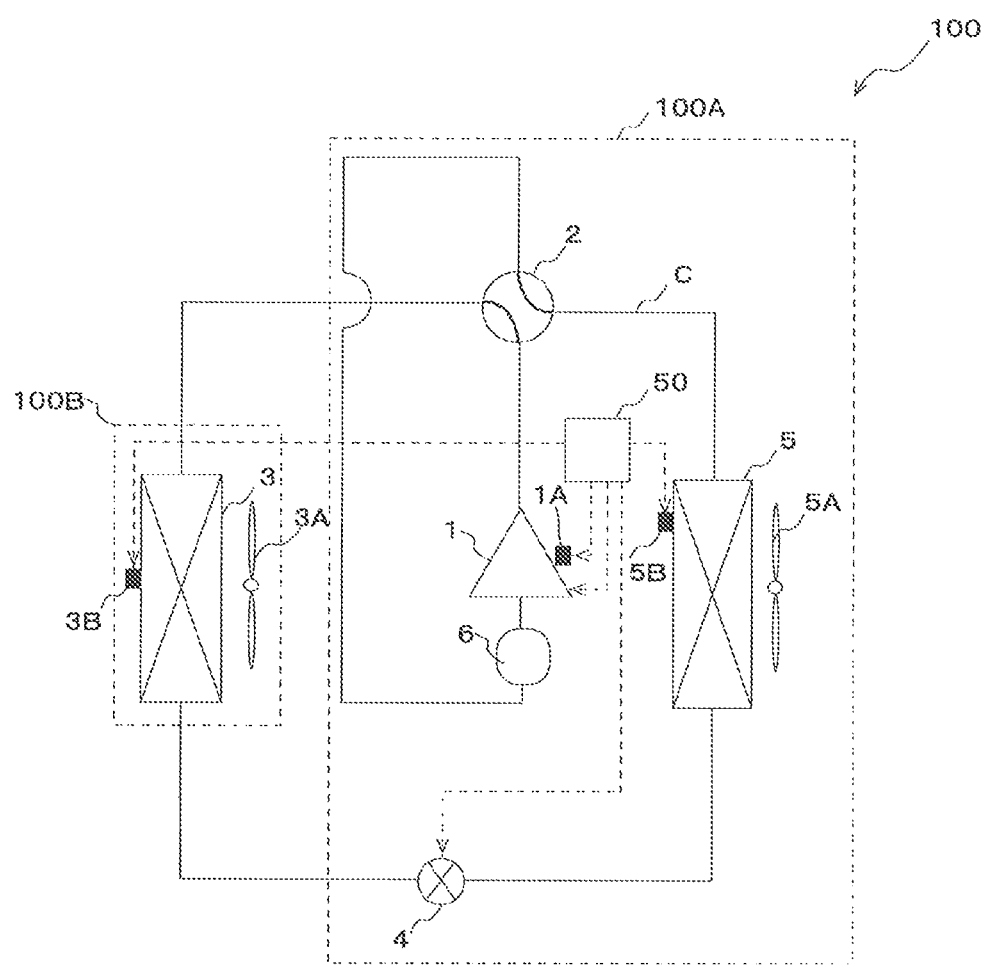
FIG. 1 illustrates an exemplary refrigerant circuit configuration of a refrigeration cycle apparatus 100 according to Embodiment 1 of the present invention.

Hereinafter, Embodiments 1 to 3 of a refrigeration cycle apparatus according to the present invention will be described referring to the drawings. The present invention is not limited to Embodiments 1 to 3 described below. In the drawings including FIG. 1 to be referred to below, the size relationship between the components may be different from the actual size relationship.

Embodiment 1

FIG. 1 illustrates an exemplary refrigerant circuit configuration of a refrigeration cycle apparatus 100 according to Embodiment 1. The configuration of the refrigeration cycle apparatus 100 will be described referring to FIG. 1.

The refrigeration cycle apparatus 100 according to Embodiment 1 is improved to reduce a decrease in reliability of a compressor 1 due to poor lubrication of a compression mechanism 23.

[Configuration of Refrigeration Cycle Apparatus 100]

The refrigeration cycle apparatus 100 can be a refrigerator or an air-conditioning apparatus, for example. In Embodiment 1, a description will be given of a case where the refrigeration cycle apparatus 100 is an air-conditioning apparatus.

The refrigeration cycle apparatus 100 includes an outdoor unit 100A installed outdoors, for example, and an indoor unit 100B that supplies conditioned air to a space to be air-conditioned (for example, an indoor space, a room in a building, and a warehouse). The outdoor unit 100A and the indoor unit 100B are connected via a refrigerant pipe.

The refrigeration cycle apparatus 100 includes the compressor 1 that compresses refrigerant to discharge high-temperature, high-pressure refrigerant, a flow switching device 2 that switches the flow path of a refrigerant circuit C, and an indoor heat exchanger 3 that serves as a condenser during a heating operation and servers as an evaporator during a cooling operation.

The refrigeration cycle apparatus 100 also includes an expansion device 4 that reduces the pressure of the refrigerant, an outdoor heat exchanger 5 that serves as an evaporator during a heating operation and serves as a condenser during a cooling operation, and an accumulator 6 that stores liquid refrigerant.

The refrigeration cycle apparatus 100 also includes an indoor fan 3A that is attached to the indoor heat exchanger 3 and supplies air to the indoor heat exchanger 3, and an outdoor fan 5A that is attached to the outdoor heat exchanger 5 and supplies air to the outdoor heat exchanger 5.

The compressor 1, the flow switching device 2, the expansion device 4, the outdoor heat exchanger 5, the outdoor fan 5A, and the accumulator 6 are mounted on the outdoor unit 100A. The indoor heat exchanger 3 and the indoor fan 3A are mounted on the indoor unit 100B.

The refrigeration cycle apparatus 100 includes a temperature detector 1A that detects a temperature of the compressor 1, a high-pressure detector 3B used to detect a pressure (an intermediate pressure) of a condenser, a high-pressure detector 5B used to detect a pressure (an intermediate pressure) of the condenser, and a controller 50 that controls the frequency of the compressor 1 and so on based on the detection results of the temperature detector 1A, the high-pressure detector 3B, and the high-pressure detector 5B. The temperature detector 1A corresponds to a first detector, and the high-pressure detector 3B and the high-pressure detector 5B correspond to a second detector. The oil level of the refrigerating machine oil in the compressor 1 can be obtained based on the temperature detected by the first detector. The concentration of the refrigerating machine oil dissolved in the refrigerant can be obtained based on the temperature detected by the first detector and the temperature or the pressure detected by the second detector.

The compressor 1 is connected at its refrigerant suction side to the accumulator 6, and at its refrigerant discharge side to the condenser via the flow switching device 2. The compressor 1 includes the compression mechanism 23 described below, and can compress the refrigerant (see FIG. 2). The compression mechanism 23 includes members such as a cylinder 25 and a piston 26. The piston 26 slides on the cylinder 25 and performs a rotational movement. Thus, to reduce wear of the piston 26 and the cylinder 25 due to friction, refrigerating machine oil is stored together with refrigerant in the compressor 1. The configuration of the compressor 1 will be described in detail referring to FIG. 2.

The accumulator 6 is connected at its refrigerant inlet side to the evaporator via the flow switching device 2, and at its refrigerant outlet side to the refrigerant suction side of the compressor 1. The accumulator 6 has a function of storing liquid refrigerant and supplying gaseous refrigerant to the compressor 1.

The flow switching device 2 connects the refrigerant discharge side of the compressor 1 and the indoor heat exchanger 3 serving as a condenser, and connects the refrigerant suction side of the compressor 1 (the refrigerant inlet side of the accumulator 6) and the outdoor heat exchanger 5 serving as an evaporator, during a heating operation. The flow switching device 2 connects the refrigerant discharge side of the compressor 1 and the outdoor heat exchanger 5 serving as a condenser, and connects the refrigerant suction side of the compressor 1 (the refrigerant inlet side of the accumulator 6) and the indoor heat exchanger 3 serving as an evaporator, during a cooling operation. The flow switching device 2 can be a four-way valve, for example.

The indoor heat exchanger 3 is connected at one side to the flow switching device 2, and at the other side to the expansion device 4. During a heating operation, one side of the indoor heat exchanger 3 communicates with the refrigerant discharge side of the compressor 1. During a cooling operation, one side of the indoor heat exchanger 3 communicates with the refrigerant suction side of the compressor 1 (the refrigerant inlet side of the accumulator 6).

The outdoor heat exchanger 5 is connected at one side to the expansion device 4, and at the other side to the flow switching device 2. During a cooling operation, one side of the outdoor heat exchanger 5 communicates with the refrigerant discharge side of the compressor 1. During a heating operation, one side of the outdoor heat exchanger 5 communicates with the refrigerant suction side of the compressor 1 (the refrigerant inlet side of the accumulator 6).

Each of the indoor heat exchanger 3 and the outdoor heat exchanger 5 can be, for example, a fin tube heat exchanger including a plurality of fins arranged in parallel, and a heat transfer pipe (tube) through which refrigerant flows and that is connected to the plurality of fins.

The expansion device 4 is connected at one side to the indoor heat exchanger 3, and at the other side to the outdoor heat exchanger 5. The expansion device 4 can be a solenoid valve or other devices capable of controlling the opening degree.

The temperature detector 1A is disposed on the compressor 1. The temperature detector 1A may include, for example, a temperature sensor such as a thermocouple, and a fixing mechanism that fixes the temperature sensor to the outer peripheral surface of the sealed container 21 of the compressor 1. The temperature detector 1A is provided in plurality on the compressor 1. Embodiment 1 illustrates an example in which three temperature detectors are provided on the compressor 1. A first temperature detector 1A1, a second temperature detector 1A2, and a third temperature detector 1A3 are arranged on the compressor 1 in this order from the lower side.

The high-pressure detector 3B is attached to the indoor heat exchanger 3, and the high-pressure detector 5B is attached to the outdoor heat exchanger 5. To detect a pressure (a high pressure) of a heat exchanger serving as a condenser, the refrigeration cycle apparatus 100 detects a high pressure based on the detection result of the high-pressure detector 3B during a heating operation, and detects a high pressure based on the detection result of the high-pressure detector 5B during a cooling operation. Each of the high-pressure detector 3B and the high-pressure detector 5B can be a pressure sensor, for example.

The controller 50 controls the frequency of the compressor 1 and the opening degree of the expansion device 4 to maintain the concentration of the refrigerating machine oil in the compressor 1 to be greater than or equal to a specified concentration that is determined in advance, and maintain the oil level of the refrigerating machine oil in the compressor 1 within a range greater than or equal to a predetermined lower limit (a minimum height) and less than or equal to a predetermined upper limit (a maximum height). The controller 50 is connected to the high-pressure detector 3B, the high-pressure detector 5B, and the temperature detectors 1A, and performs predetermined operations based on their outputs. This will be described below.

The controller 50 calculates the oil level in the compressor 1 based on the detection results of the temperature detectors 1A. The controller 50 calculates the oil level based on the detection results of the temperature detectors 1A including a plurality of (three in Embodiment 1) temperature sensors. This will be described later referring to FIG. 1E.

Although Embodiment 1 illustrates an example in which the refrigeration cycle apparatus 100 includes the high-pressure detector 3B, the high-pressure detector 5B, and the temperature detectors 1A, the present invention is not limited thereto. The refrigeration cycle apparatus 100 may obtain information on the high pressure (information on the oil-level concentration) and information on the temperature (information on the oil level) from the outside. For example, similar to a central controller of an air-conditioning system, an integrated controller that controls each refrigeration cycle apparatus 100 may be provided separately from the controller 50 of the refrigeration cycle apparatus 100. Information on the high pressure, information on the temperature, and other types of information are gathered to the central controller. The integrated controller may be configured to obtain, from the outside, the information on the high pressure and the information on the temperature that are output from the central controller.

The controller 50 calculates a pressure (a high pressure) after discharge from the compressor 1 but before decompression by the expansion device 4, based on the detection result of the high-pressure detector 3B or the high-pressure detector 5B. Then, the controller 50 calculates the concentration of the refrigerating machine oil, based on the high pressure calculated based on the detection result of the high-pressure detector 3B or the high-pressure detector 5B, and the detection results of the temperature detectors 1A.

As described above, the controller 50 calculates the oil level of the refrigerating machine oil in the compressor 1, and calculates the concentration of the refrigerating machine oil in the compressor 1. Then, based on the results of these calculations, the controller 50 controls the frequency of the compressor 1 and the opening degree of the expansion device 4 to maintain the concentration to be greater than or equal to the specified concentration, and maintain the oil level to be greater than or equal to the lower limit. The control of the frequency of the compressor 1 and the opening degree of the expansion device 4 will be described below referring to FIG. 9.

[Configuration of Compressor 1]

Figure 2:
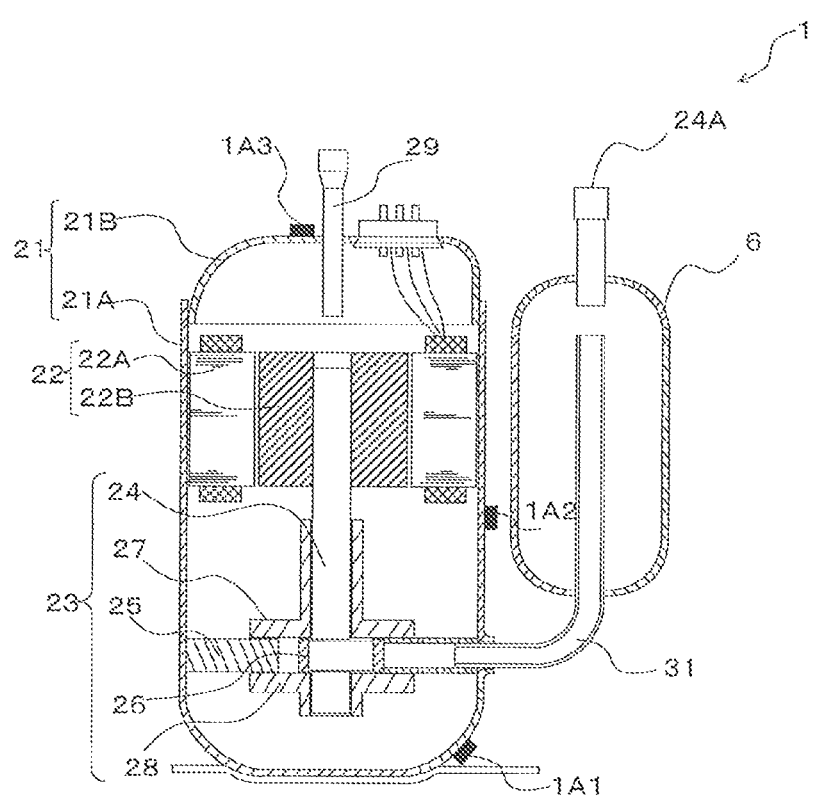
FIG. 2 schematically illustrates the configuration of a compressor 1 of the refrigeration cycle apparatus 100 according to Embodiment 1 of the present invention.

FIG. 2 schematically illustrates the configuration of the compressor 1 of the refrigeration cycle apparatus 100 according to Embodiment 1. The configuration of the compressor 1 will be described referring to FIG. 2.

As illustrated in FIG. 2, the compressor 1 includes a sealed container 21, a motor mechanism 22, a compression mechanism 23, and an accumulator 6 storing liquid refrigerant. The compressor 1 further includes a suction pipe 31 that connects the accumulator 6 and the sealed container 21.

The sealed container 21 accommodates the motor mechanism 22 and the compression mechanism 23. The accumulator 6 is connected to the sealed container 21 through various pipes. The sealed container 21 includes a body 21A having a bottomed cylindrical shape, and an upper shell 21B attached to an opening formed at the top of the lower part of the container. The upper shell 21B is press-fitted in the body 21A, and is connected thereto by welding, for example. An opening for insertion of the suction pipe 31 is formed in the body 21A of the sealed container 21. A discharge pipe 29 that discharges refrigerant compressed by the compression mechanism 23 is connected to the upper shell 21B.

Temperature detectors 1A are disposed on the outer peripheral surface of the sealed container 21. More specifically, the first temperature detector 1A1 is disposed on the bottom of the body 21A. For example, the first temperature detector 1A1 is disposed below the compression mechanism 23. Further, the second temperature detector 1A2 is disposed in an intermediate height position of the body 21A. For example, the second temperature detector 1A2 is disposed in a height position corresponding to the lower part of the motor mechanism 22. Further, the third temperature detector 1A3 is disposed on the upper shell 21B.

The motor mechanism 22 includes, for example, a stator 22A fixed to the inner peripheral surface of the sealed container 21, and a rotor 22B rotatably disposed inside the stator 22A. A wire carrying an electric current is wound around the stator 22A, for example. Further, a drive shaft 24 of the compression mechanism 23 (described below) is connected to the rotor 22B.

The compression mechanism 23 includes a cylinder 25 having a space for compressing refrigerant gas, the drive shaft 24 that transmits a driving force of the motor mechanism 22, an upper bearing 27 and a lower bearing 28 that support the drive shaft 24, and a piston 26 that is fitted around an eccentric part of the drive shaft 24 and rotates in the cylinder 25.

One end of the suction pipe 31 is connected to the cylinder 25. The refrigerant in the accumulator 6 is supplied to the cylinder 25. Then, since the piston 26 is disposed in the cylinder 25, the refrigerant is compressed by rotation of the piston 26. The drive shaft 24 is connected at its upper end side to the rotor 22B, and at its lower end side to the upper bearing 27 and the lower bearing 28. The drive shaft 24 transmits the driving force of the motor mechanism 22 to the piston 26. The upper bearing 27 and the lower bearing 28 are disposed on an upper surface and a lower surface of the cylinder 25.

The accumulator 6 is used to store liquid refrigerant and supply gaseous refrigerant to the compression mechanism 23, and a refrigerant inlet pipe 24A is connected to the upper part thereof. Further, the suction pipe 31 is connected to the lower part of the accumulator 6.

The suction pipe 31 is connected at one side to the cylinder 25 in the sealed container 21, and at the other side to the accumulator 6.

[Amount of Refrigerating Machine Oil Taken Out From Compressor 1]

Figure 3:
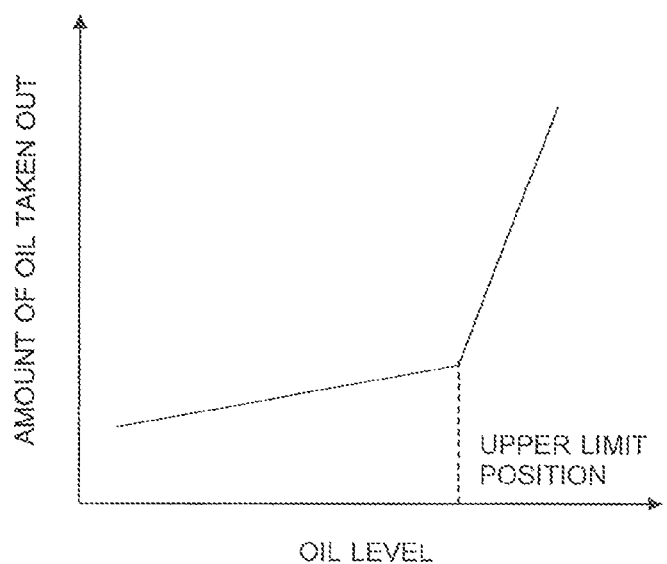
FIG. 3 is a graph representing the relationship between the oil level of refrigerating machine oil in the compressor 1 and the amount of refrigerating machine oil taken from the compressor 1.
Figure 4:
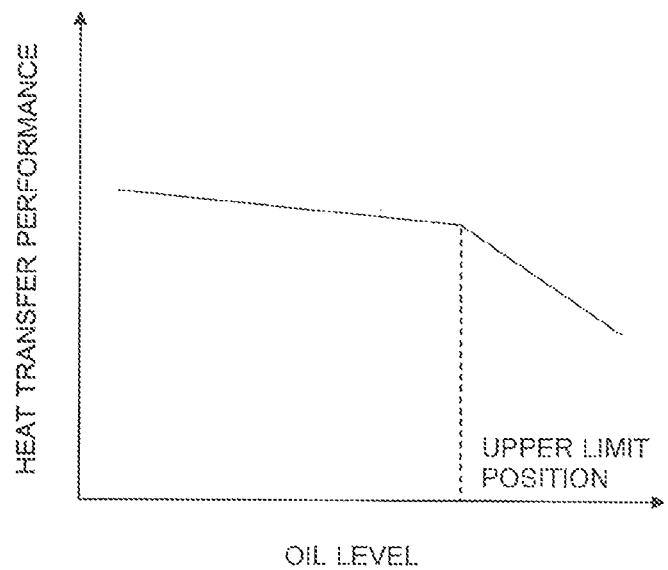
FIG. 4 is a graph representing the relationship between the oil level of refrigerating machine oil in the compressor 1 and the heat transfer performance of a heat exchanger.

FIG. 3 is a graph representing the relationship between the oil level of refrigerating machine oil in the compressor 1 and the amount of refrigerating machine oil taken from the compressor 1, and FIG. 4 is a graph representing the relationship between the oil level of refrigerating machine oil in the compressor 1 and the heat transfer performance of a heat exchanger.

(1) When the oil level in the compressor 1 is extremely high, the refrigerating machine oil is discharged together with the refrigerant discharged from the discharge pipe 29. As illustrated in FIG. 3, when the oil level exceeds the upper limit position, the amount of refrigerating machine oil taken out from the compressor 1 increases rapidly. In the case where the compressor 1 is a rotary compressor, the upper limit position illustrated in FIG. 3 corresponds to the height position of the lower part of the motor mechanism 22. This is because rotation of the rotor 22B of the motor mechanism 22 exerts an action of swirling up the refrigerant and refrigerating machine oil.

(2) On the other hand, when the oil level in the compressor 1 is extremely low, the refrigerating machine oil is exhausted, so that it is not possible to lubricate the compression mechanism 23.

(3) As illustrated in FIG. 3, when the oil level exceeds the upper limit position, the amount of refrigerating machine oil taken out from the compressor 1 increases rapidly, and the refrigerating machine oil that is take out flows into, for example, the indoor heat exchanger 3 and the outdoor heat exchanger 5. Therefore, as illustrated in FIG. 4, when the oil level exceeds the upper limit position, the amount of refrigerating machine oil stored in the indoor heat exchanger 3 and the outdoor heat exchanger 5 increases, so that the heat transfer performance of the indoor heat exchanger 3 and the outdoor heat exchanger 5 decreases. The term "heat transfer" as used herein refers to transfer of heat from the refrigerant to the air, or from the air to the refrigerant.

Accordingly, by maintaining the oil level in the compressor 1 within an appropriate range, (1) it is possible to reduce the risk that the concentration of the refrigerating machine oil decreases due to the refrigerating machine oil being taken out and thus the compression mechanism 23 is poorly lubricated. (2) It is also possible to reduce the risk that the compression mechanism 23 is poorly lubricated due to exhaustion of refrigerating machine oil. (3) It is also possible to reduce a decrease in heat transfer performance of the heat exchanger.

[Solubility of Refrigerating Machine Oil in Refrigerant]

Figure 5:
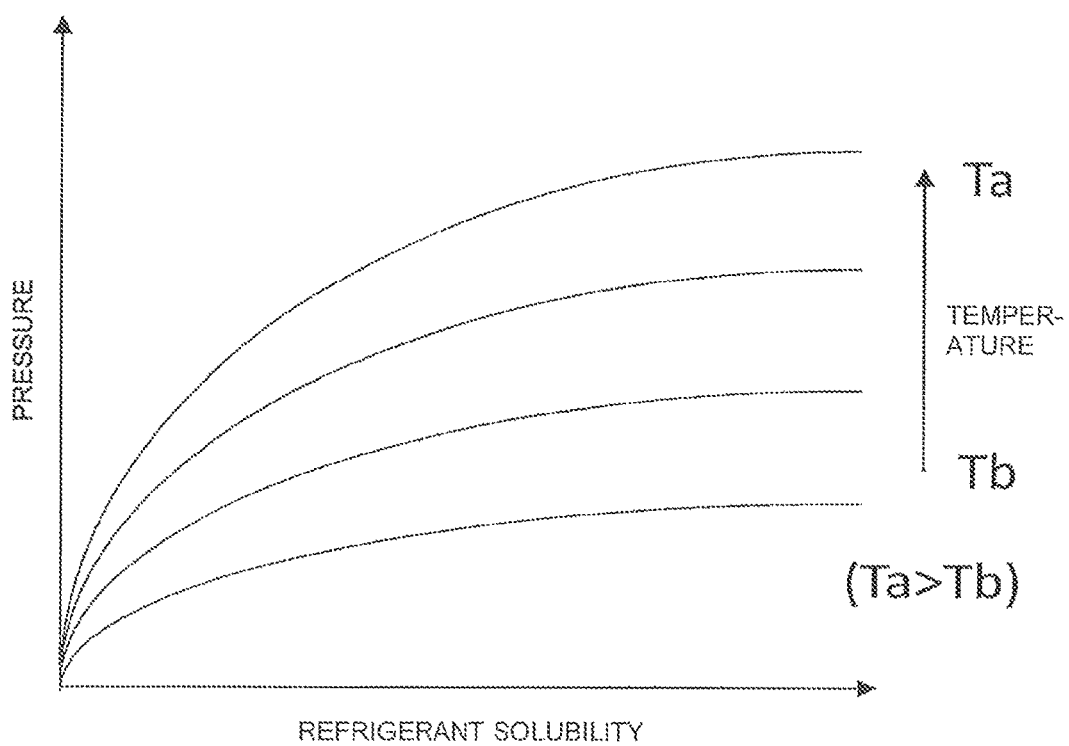
FIG. 5 is a graph illustrating the solubility of refrigerating machine oil in relation to the refrigerant pressure and the refrigerant temperature.

FIG. 5 is a graph illustrating the solubility of refrigerating machine oil in relation to the refrigerant pressure and the refrigerant temperature. The solubility of refrigerating machine oil in refrigerant will be described referring to FIG. 5.

The term "solubility" as used herein refers to how much refrigerating machine oil can be dissolved in refrigerant of a given pressure and a given temperature. That is, the concentration of refrigerating machine oil is related to the solubility. For example, when refrigerating machine oil is dissolved in refrigerant to the limit of solubility in refrigerant (a saturated state), the value of the concentration of refrigerating machine oil corresponds to the solubility. Note that refrigerating machine oil corresponds to solute, and refrigerant (liquid refrigerant) corresponds to solvent.

As indicated by a plurality of curves in FIG. 5, the solubility of refrigerating machine oil increases as the refrigerant temperature increases. Further, as illustrated in FIG. 5, the solubility of refrigerating machine oil increases as the refrigerant pressure increases. It is understood from FIG. 5 that in the case where the temperature is fixed to a constant value while the refrigerant pressure is varied, the rate on increase in solubility slows down as the refrigerant pressure increases.

The controller 50 is configured to be able to calculate the concentration of the refrigerating machine oil in the compressor 1, from the refrigerant pressure and the refrigerant temperature. The controller 50 may be configured to include a table indicating the correspondence of the refrigerant pressure and refrigerant temperature to the concentration of refrigerating machine oil. Here, the refrigerant pressure corresponds to the detection results of the high-pressure detector 3B and the high-pressure detector 5B, and the refrigerant temperature corresponds to the detection results of the temperature detectors 1A.

As illustrated in FIG. 5, the solubility of refrigerating machine oil changes with the refrigerant temperature and the refrigerant pressure. Therefore, in the case where the refrigerant temperature and the refrigerant pressure are low, the solubility is low, so that the amount of refrigerating machine oil that can be dissolved in refrigerant is limited, resulting in reducing the concentration of the refrigerating machine oil.

There are also other factors that reduce the concentration of the refrigerating machine oil. For example, when the compressor 1 is started and when liquid back occurs, the amount of liquid refrigerant in the compressor 1 increases. Thus, the refrigerating machine oil in the compressor 1 is dissolved in liquid refrigerant in the compressor 1 to become a mixture, so that the concentration of the refrigerating machine oil in the compressor 1 decreases. That is, the concentration of the refrigerating machine oil decreases due to an increase in the amount of refrigerant serving as a solvent, other than due to the refrigerant temperature and pressure as described above.

When the concentration of the refrigerating machine oil decreases, the compression mechanism 23 is poorly lubricated. Accordingly, the refrigeration cycle apparatus 100 according to Embodiment 1 controls the compressor 1 and other components to prevent the concentration of the refrigerating machine oil from decreasing to be less than the specified value due to an increase or other changes in the amount of refrigerating machine oil in the compressor 1 caused by various factors.

[Oil Level of Compressor 1]

Figure 6:
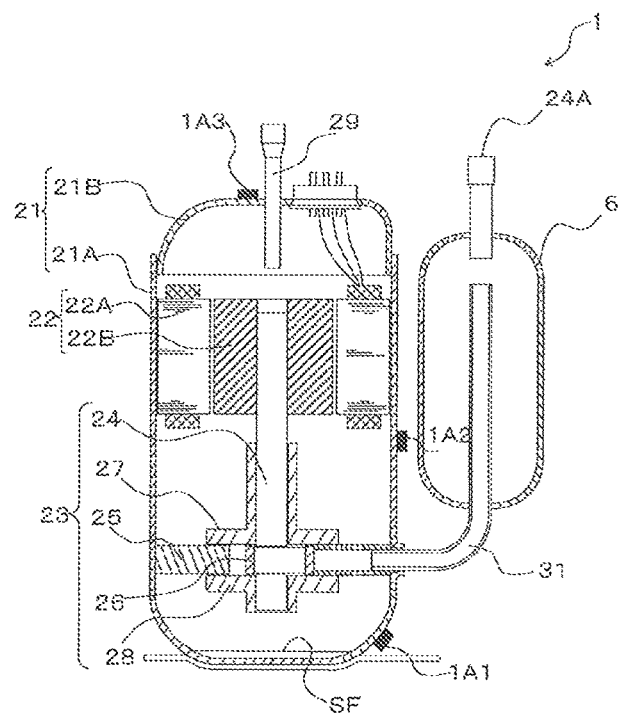
FIG. 6 illustrates a state in which the oil level position is lower than the first temperature detector 1A1.
Figure 7:
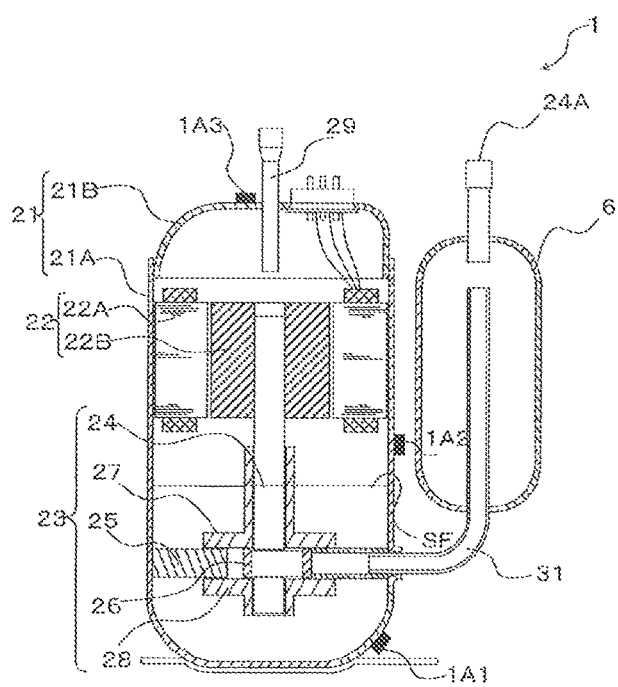
FIG. 7 illustrates a state in which the oil level is between the first temperature detector 1A1 and the second temperature detector 1A2.
Figure 8:
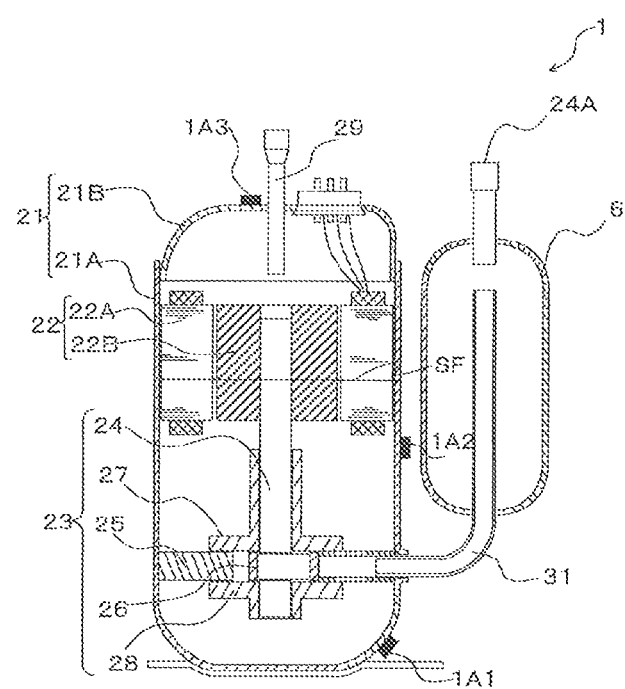
FIG. 8 illustrates a state in which the oil level is higher than the second temperature detector 1A2.

FIGS. 6 to 8 illustrate the oil level of the refrigerating machine oil in the compressor 1. FIG. 6 illustrates a state in which the oil level position is lower than the first temperature detector 1A1. FIG. 7 illustrates a state in which the oil level is between the first temperature detector 1A1 and the second temperature detector 1A2. FIG. 8 illustrates a state in which the oil level is higher than the second temperature detector 1A2. The oil level corresponds to the distance from the bottom of the sealed container 21 of the compressor 1 to an oil surface SF.

In the state illustrated in FIG. 6, the oil level position is lower than the first temperature detector 1A1, and the refrigerating machine oil is exhausted. That is, the oil level is extremely low, and the compression mechanism 23 is likely to be poorly lubricated regardless of the degree of concentration of the refrigerating machine oil. The height position of the first temperature detector 1A1 corresponds to the lower limit.

In the state illustrated in FIG. 7, the oil level is between the first temperature detector 1A1 and the second temperature detector 1A2, and is appropriate in terms of the oil level. If the concentration of the refrigerating machine oil is appropriate (greater than or equal to the specified value), the compression mechanism 23 can be more reliably lubricated. The height position of the second temperature detector 1A2 corresponds to the upper limit.

In the state illustrated in FIG. 8, the oil level position is higher than the second temperature detector 1A2, that is, the oil level is extremely high. More specifically, the oil level is extremely high, and the amount of refrigerating machine oil taken out from the compressor 1 is increased.

The controller 50 uses the temperature detection results by the temperature detectors 1A disposed on the outer peripheral surface of the sealed container 21 as the temperature detection results. Since the refrigerant and refrigerating machine oil are stored in the space inside the sealed container 21, the temperature detectors 1A are not in direct contact with the refrigerant and refrigerating machine oil. However, the sealed container 21 is made of a material having good heat conductance (for example, iron), and therefore it is possible to avoid a reduction in accuracy of detecting the oil level.

If the detection results of the first temperature detector 1A1, the second temperature detector 1A2, and the third temperature detector 1A3 are the same, the controller 50 calculates that the oil level is less than the lower limit. If the detection result of the third temperature detector 1A3 is greater than the detection results of the first temperature detector 1A1 and the second temperature detector 1A2, the controller 50 calculates that the oil level is greater than or equal to the upper limit. If the detection results of the second temperature detector 1A2 and the third temperature detector 1A3 are greater than the detection result of the first temperature detector 1A1, the controller 50 calculates that the oil level is within a range greater than or equal to the lower limit and less than the upper limit.

[Control of Refrigeration Cycle Apparatus 100]

Figure 9:
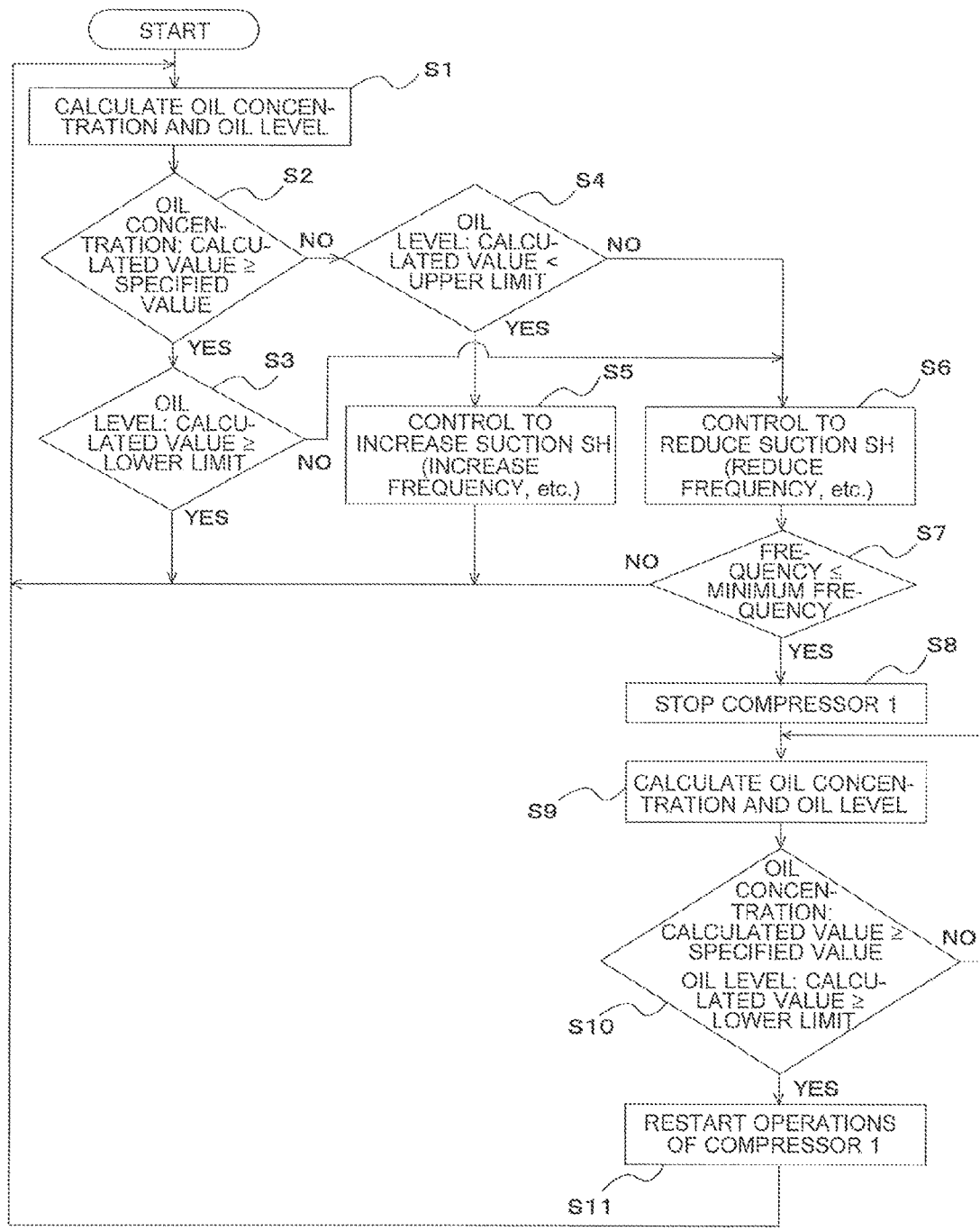
FIG. 9 illustrates an exemplary control flowchart of the refrigeration cycle apparatus 100 according to Embodiment 1 of the present invention.

FIG. 9 illustrates an exemplary control flowchart of the refrigeration cycle apparatus 100 according to Embodiment 1. The control of the refrigeration cycle apparatus 100 will be described referring to FIG. 9. Note that the degree of suction superheat of the compressor 1 corresponds to a suction superheat SH (suction superheat) in FIG. 9.

(Step S1)

The controller 50 calculates the oil level in the compressor 1 based on the detection results of the plurality of temperature detectors 1A. The controller 50 also calculates the concentration of the refrigerating machine oil based on the detection results of the high-pressure detector 3B and the temperature detectors 1A. Note that for calculating the concentration of the refrigerating machine oil, one of the temperature detectors 1A (for example, the first temperature detector 1A1) may be used, or all the temperature detectors 1A may be used to obtain an average value.

(Step S2)

The controller 50 determines whether the concentration of the refrigerating machine oil is greater than or equal to the specified value.

If the concentration is greater than or equal to the specified value, the process moves to step S3.

If the concentration is less than the specified value, the process moves to step S4.

(Step S3)

The controller 50 determines whether the oil level is greater than or equal to the lower limit. The lower limit corresponds to the height position in which the first temperature detector 1A1 is disposed.

If the oil level is greater than or equal to the lower limit, the process returns to START.

If the oil level is less than the lower limit, the process moves to step S6.

(Step S4)

The controller 50 determines whether the oil level is greater than or equal to the upper limit. The upper limit corresponds to the height position in which the second temperature detector 1A2 is disposed.

If the oil level is greater than or equal to the upper limit, the process moves to step S5.

If the oil level is less than the upper limit, the process moves to step S6.

(Step S5)

The controller 50 executes a control operation that increases the frequency of the compressor 1. After that, the process returns to START. In step S5, in addition to the control operation that increases the frequency of the compressor 1, the controller 50 may reduce the opening degree of the expansion device 4. Alternatively, in step S5, in place of the control operation that increases the frequency of the compressor 1, the controller 50 may reduce the opening degree of the expansion device 4. That is, in step S5, the controller 50 executes at least one of the control operation that increases the frequency of the compressor 1 and the control operation that reduces the opening degree of the expansion device 4.

When a large amount of liquid refrigerant is stored in the compressor 1, the liquid refrigerant and the refrigerating machine oil are mixed, so that the concentration of the refrigerating machine oil decreases while the oil level increases. The refrigerating machine oil in step S5 is in a state in which a large amount of liquid refrigerant is stored in the compressor 1, and the concentration of the refrigerating machine oil is low.

In step S5, even by executing only one of the control operation that increases the frequency of the compressor 1 and the control operation that reduces the opening degree of the expansion device 4, it is possible to reduce the amount of liquid refrigerant stored in the compressor 1.

In step S5, execution of the control operations that increase the frequency of the compressor 1 and reduce the opening degree of the expansion device 4 corresponds to execution of a control operation that increases the degree of suction superheat of the compressor 1.

By executing the control operation that increases the frequency of the compressor 1, the amount of refrigerant existing as liquid in the compressor 1 is reduced. Further, by executing the control operation that reduces the opening degree of the expansion device 4, the amount of liquid refrigerant that returns to the compressor 1 is reduced.

(Step S6)

The controller 50 executes a control operation that reduces the frequency of the compressor 1. After that, the process moves to step S7.

In step S6, in addition to the control operation that reduces the frequency of the compressor 1, the controller 50 may increase the opening degree of the expansion device 4. Alternatively, in step S6, in place of the control operation that reduces the frequency of the compressor 1, the controller 50 may increase the opening degree of the expansion device 4. That is, in step S6, the controller 50 executes at least one of the control operation that reduces the frequency of the compressor 1 and the control operation that increases the opening degree of the expansion device 4.

The refrigerating machine oil in step S6 is in a state in which although the concentration of the refrigerating machine oil is high, the oil level is low and the refrigerating machine oil is exhausted (through steps S2 and S3), or in a state in which although the amount of liquid refrigerant in the compressor 1 is not excessively large, the concentration of the refrigerating machine oil is low (through steps S2 and S4).

In step S6, even by executing only one of the control operation that reduces the frequency of the compressor 1 and the control operation that increases the opening degree of the expansion device 4, it is possible to increase the amount of refrigerating machine oil in the compressor 1 to avoid exhaustion of refrigerating machine oil, or increase the concentration of the refrigerating machine oil.

In step S6, execution of the control operations that reduce the frequency of the compressor 1 and increase the opening degree of the expansion device 4 corresponds to execution of the control operation that increases the degree of suction superheat of the compressor 1 to increase the amount of refrigerating machine oil returned to the compressor 1.

By executing the control operation that reduces the frequency of the compressor 1, the amount of refrigerating machine oil taken out from the compressor 1 is reduced. Further, by executing the control operation that increases the opening degree of the expansion device 4, the amount of refrigerating machine oil that returns to the compressor 1 can be increased. This is because, since the refrigerating machine oil is carried together with the refrigerant, the amount of refrigerating machine oil that returns to the compressor 1 together with the refrigerant is increased by increasing the opening degree of the expansion device 4.

(Step S7)

The controller 50 determines whether the frequency of the compressor 1 is less than or equal to the minimum frequency.

If the frequency is not less than or equal to the minimum frequency, the process returns to START.

If the frequency is less than or equal to the minimum frequency, the process moves to step S8.

(Step S8)

The controller 50 stops the compressor 1. After that, the process moves to step S9.

(Step S9)

Separately from step S1, the controller 50 calculates again the concentration of the refrigerating machine oil. The calculation means may be the same as that of step S1. After that, the process moves to step S10.

(Step S10)

The controller 50 determines whether the concentration of the refrigerating machine oil is greater than or equal to a specified value, and whether the oil level of the refrigerating machine oil is greater than or equal to a lower limit. The specified value and the lower limit used here may be the same as the specified value in step S2 and the lower limit in step S3.

If the both conditions are satisfied, the process moves to step S11.

If any of the conditions is not satisfied, the process returns to step S9.

(Step S11)

The controller 50 restarts operations of the compressor 1. The frequency of the compressor 1 used here may be the same as that used when the compressor 1 is stopped in step S8, or may be another predetermined frequency.

The control in steps S8 to S11 is executed when the process has passed through steps S6 and S7.

Since the process has passed through step S6, the refrigerating machine oil is in a state in which although the concentration of the refrigerating machine oil is high, the oil level is low and the refrigerating machine oil is exhausted (through steps S2 and S3), or in a state in which although the amount of liquid refrigerant in the compressor 1 is not excessively large, the concentration of the refrigerating machine oil is low (through steps S2 and S4).

Further, since the process has passed through step S7 in which the determination is YES, the frequency of the compressor 1 is likely to be extremely low (in Embodiment 1, close to the minimum frequency), and the amount of refrigerating machine oil taken out from the compressor 1 is small. The control in steps S8 to S11 is intended to temporarily stop the compressor 1 until recovery from exhaustion if the refrigerating machine oil remains exhausted after step S6 although the amount of refrigerating machine oil that is taken out is small.

Further, even when the compressor 1 is stopped, a differential pressure is generated in the refrigerant circuit C. Therefore, the refrigerating machine oil in the refrigerant circuit C discharged from the compressor 1 can be returned to the compressor 1. Thus, it is possible to increase the concentration of the refrigerating machine oil, and avoid exhaustion of refrigerating machine oil. If the concentration of the refrigerating machine oil becomes greater than or equal to the specified value, the operation of the compressor 1 is restarted.

[Advantageous Effects of Refrigeration Cycle Apparatus 100 According to Embodiment 1]

The refrigeration cycle apparatus 100 according to Embodiment 1 includes the refrigerant circuit C including the compressor 1, the condenser, the expansion device 4, and the evaporator that are connected by a refrigerant pipe. Since the refrigeration cycle apparatus 100 according to Embodiment 1 includes the controller 50 that controls at least one of the frequency of the compressor 1 and the opening degree of the expansion device 4 based on the concentration of the refrigerating machine oil in the compressor 1 and the oil level of the refrigerating machine oil in the compressor 1, it is possible to reduce a decrease in reliability of the compressor 1 due to poor lubrication of the compression mechanism 23.

[Modification 1 of Embodiment 1]

In Embodiment 1, the high-pressure detector 3B and the high-pressure detector 5B are used as the second detector. However, the present invention is not limited thereto. The refrigeration cycle apparatus 100 may include a pressure sensor that detects the pressure of refrigerant discharged from the compressor 1, in place of the high-pressure detector 3B and the high-pressure detector 5B, for example.

Alternatively, the refrigeration cycle apparatus 100 may use as the second detector an intermediate temperature sensor that detects the temperature of the condenser, or may use as the second detector a discharge temperature sensor that detects the temperature of refrigerant discharged from the compressor 1, in place of the high-pressure detector 3B and the high-pressure detector 5B, for example. In the case where an intermediate temperature sensor is used, the controller 50 can calculate a high pressure by converting a saturation temperature from the detection result of the temperature (the intermediate temperature) of the condenser. In the case where a discharge temperature sensor is used, the controller 50 can calculate a high pressure by converting a saturation temperature from the detection result of the temperature (the discharge temperature) of refrigerant discharged from the compressor 1.

[Modification 2 of Embodiment 1]

In Embodiment 1, although an example has been described in which there is a limit on the amount of refrigerating machine oil that can be dissolved in refrigerant, the present invention is not limited thereto. Even in the case where refrigerating machine oil is infinitely dissolved in refrigerant, the same advantageous effects as those of the refrigeration cycle apparatus 100 according to Embodiment 1 can be obtained.

As in Modification 2, in the case where refrigerating machine oil is infinitely dissolved in refrigerant, the oil level in the compressor 1 may be detected after reducing the opening degree of the expansion device 4, for example, to secure the degree of suction superheat. That is, another step in which the opening degree of the expansion device 4 is reduced may be provided before step S1.

Embodiment 2

Figure 10:
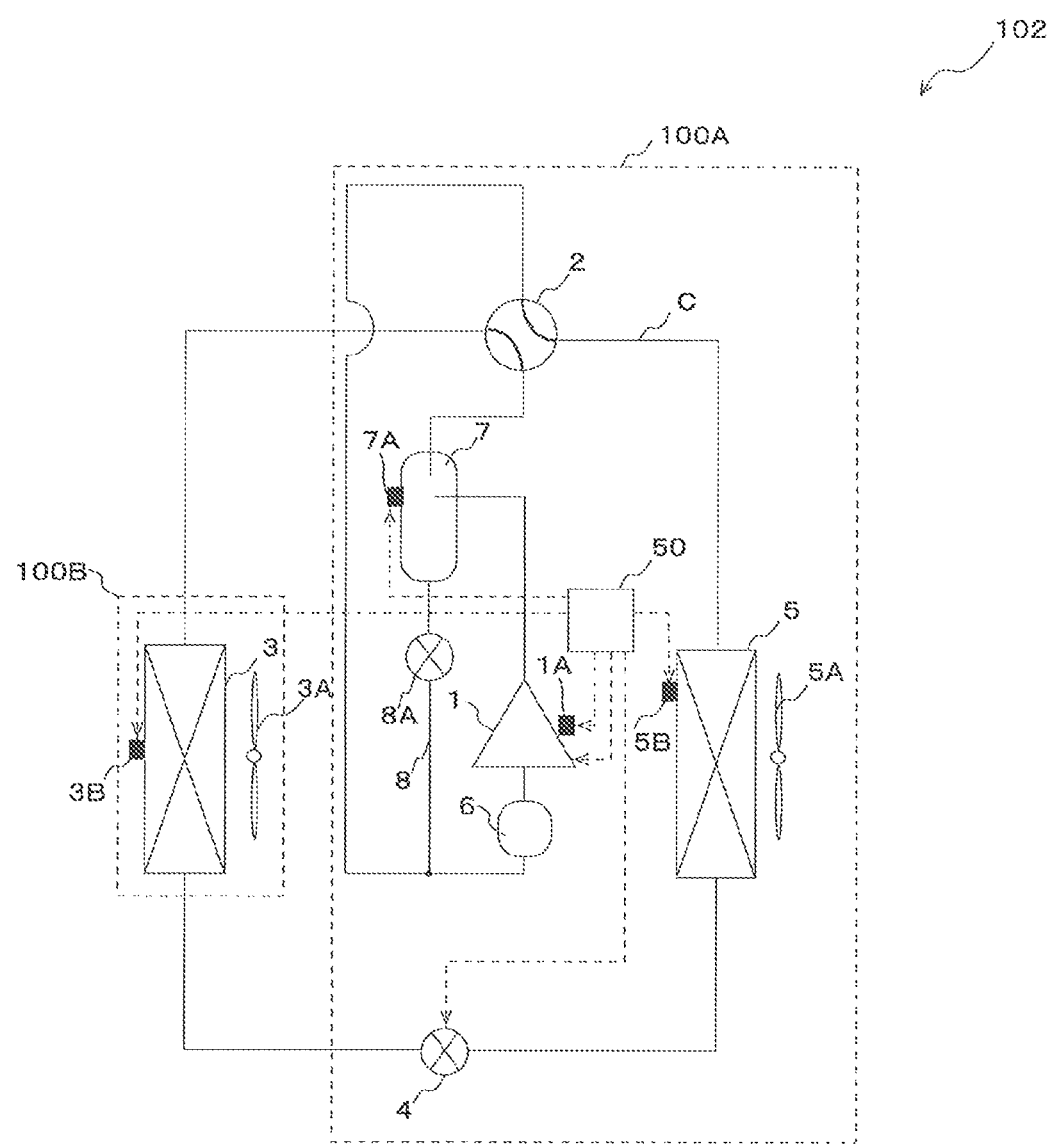
FIG. 10 illustrates an exemplary refrigerant circuit configuration of a refrigeration cycle apparatus 102 according to Embodiment 2 of the present invention.

FIG. 10 illustrates an exemplary refrigerant circuit configuration of a refrigeration cycle apparatus 102 according to Embodiment 2. In Embodiment 2, elements common to Embodiment 1 are denoted by the same reference signs, and the following description will focus on the differences from Embodiment 1.

[Configuration of Refrigeration Cycle Apparatus 102]

First, the configuration of the refrigeration cycle apparatus 102 according to Embodiment 2 will be described.

The refrigeration cycle apparatus 102 according to Embodiment 2 includes an oil separator 7 that is connected to the refrigerant discharge side of a compressor 1 and separates refrigerating machine oil from refrigerant and, an oil return pipe 8 that connects the oil separator 7 and the refrigerant suction side of the compressor 1 and returns refrigerating machine oil stored in the oil separator 7, and an oil regulating valve 8A that is provided in the oil return pipe 8 and is used to open and close the flow path of the oil return pipe 8.

Note that since an accumulator 6 is connected to the suction side of the compressor 1, the oil return pipe 8 is connected at one end to the oil separator 7, and at the other end connected to the suction side of the compressor 1 via the accumulator 6. If the refrigeration cycle apparatus 102 does not include the accumulator 6, the oil return pipe 8 is connected at the other end directly to the suction side of the compressor 1.

The oil regulating valve 8A may be a solenoid valve capable of switching between two states, namely, an open state and a closed state, or may be a solenoid valve capable of adjusting the opening degree, for example. Embodiment 2 illustrates an example of a case where the oil regulating valve 8A is a solenoid valve capable of adjusting the opening degree.

A controller 50 of the refrigeration cycle apparatus 102 according to

Embodiment 2 is similar to that of Embodiment 1 in calculating the oil level in the compressor 1 based on the detection results of temperature detectors 1A, and calculating the concentration of the refrigerating machine oil based on the detection results of a high-pressure detector 3B, a high-pressure detector 5B, and the temperature detectors 1A. In Embodiment 2, the controller 50 is configured to control at least one of the frequency of the compressor 1, the opening degree of an expansion device 4, and the opening degree of the oil regulating valve 8A to maintain the concentration to be greater than or equal to a specified concentration, and maintain the oil level within a range greater than or equal to the lower limit and less than the upper limit.

[Control of Refrigeration Cycle Apparatus 102]

Figure 11:
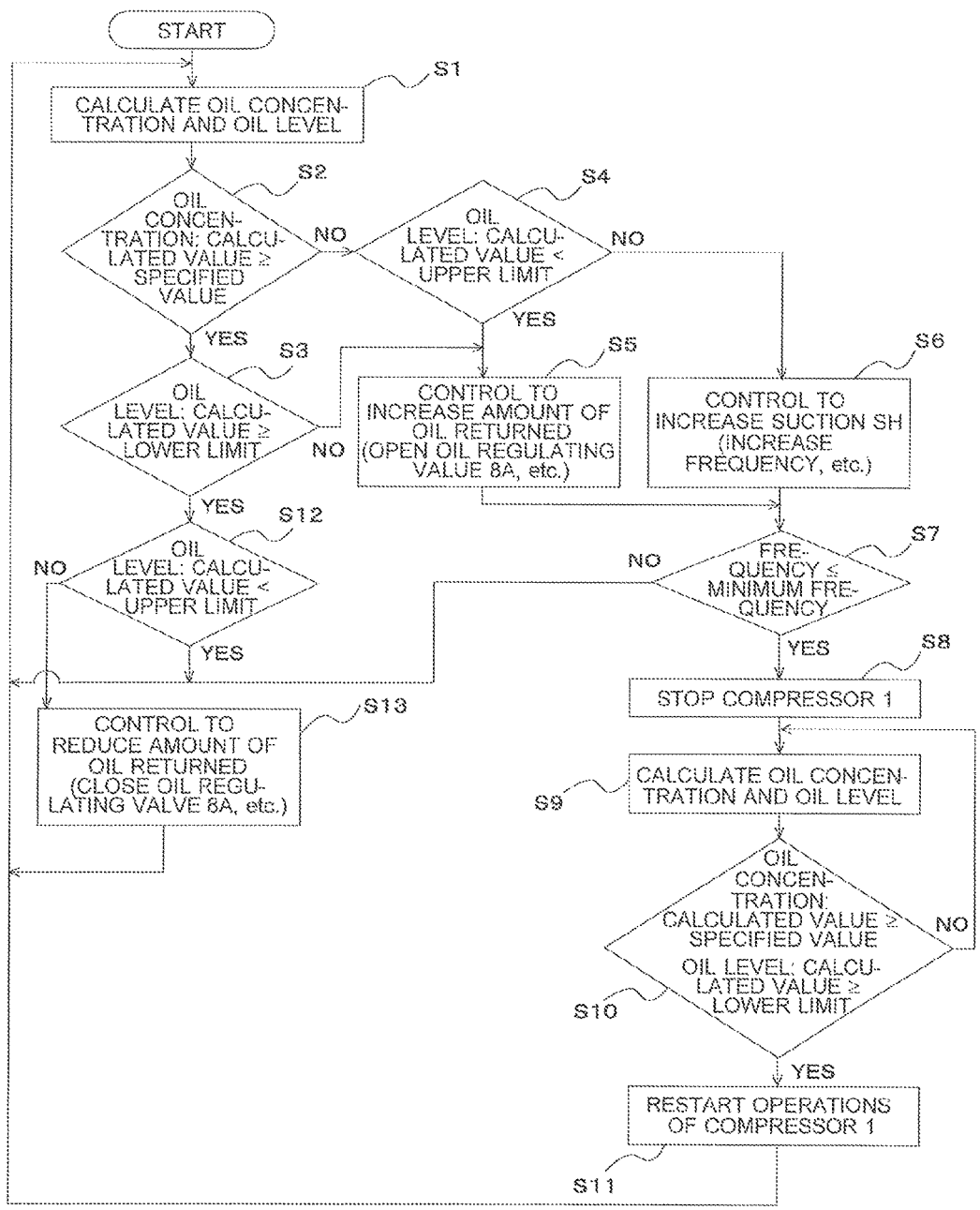
FIG. 11 illustrates an exemplary control flowchart of the refrigeration cycle apparatus 102 according to Embodiment 2 of the present invention.

FIG. 11 illustrates an exemplary control flowchart of the refrigeration cycle apparatus 102 according to Embodiment 2. In the following, the control of the refrigeration cycle apparatus 102 according to Embodiment 2 will be described.

In Embodiment 2, the inequality sign in step S4 is reversed from that of Embodiment 1. Accordingly, step S6 of Embodiment 2 corresponds to step S5 of Embodiment 1, and step S5 of Embodiment 2 corresponds to step S6 of Embodiment 1. Therefore, if the determination is NO in step S3 of Embodiment 2, the process moves not to step S6 but to step S5. The following describes steps S5 and S6 in Embodiment 2.

(Step S5)

If the concentration of the refrigerating machine oil is greater than or equal to the specified concentration and the oil level is less than the lower limit, or if the concentration of the refrigerating machine oil is less than the specified concentration and the oil level is less than the upper limit, the controller 50 executes a control operation that increases the amount of refrigerating machine oil returned. That is, the controller 50 executes at least one of the control operation that reduces the frequency of the compressor 1, the control operation that increases the opening degree of the expansion device 4, and a control operation that increases the opening degree of the oil regulating valve 8A.

In step S5, by increasing the opening degree of the oil regulating valve 8A, the refrigerating machine oil can be returned to the compressor 1 with high efficiency. This is because a large part of the refrigerating machine oil discharged from the compressor 1 is stored in the oil separator 7. Accordingly, in step S5, the controller 50 may execute the control operation that increases the opening degree of the oil regulating valve 8A and, depending on the situation, may additionally execute the control operation that reduces the frequency of the compressor 1 and the control operation that increases the opening degree of the expansion device 4.

For example, if the amount of refrigerating machine oil in the oil separator 7 is small, this indicates that the refrigerating machine oil is flowed into pipes and other components downstream of the oil separator 7. In this situation, the controller 50 may execute the control operation that reduces the frequency of the compressor 1, and the control operation that increases the opening degree of the expansion device 4.

The determination as to whether the refrigerating machine oil stored in the oil separator 7 is decreasing may be made using the same means as that of the temperature detectors 1A. That is, temperature detectors 7A may be provided on the side and the bottom of the oil separator 7. Then, the controller 50 calculates the oil level in the oil separator 7 based on the detection results of the temperature detectors 7A, and calculates the amount of refrigerating machine oil stored in the oil separator 7.

(Step S6)

If the concentration of the refrigerating machine oil is less than the specified concentration, and the oil level is greater than or equal to the upper limit, the controller 50 executes the control operation that increases the degree of suction superheat. That is, the controller 50 executes at least one of the control operation that increases the frequency of the compressor 1 and the control operation that reduces the opening degree of the expansion device 4. The control content is the same as that of step S5 of Embodiment 1.

In Embodiment 2, steps S12 and S13 are newly added. The following describes steps S12 and S13.

(Step S12)

The controller 50 determines whether the oil level is less than the upper limit.

If the oil level is less than the upper limit, the process returns to START.

If the oil level is greater than or equal to the upper limit, the process moves to step S13.

(Step S13)

To reduce the amount of refrigerating machine oil and refrigerant returned to the compressor 1, the controller 50 executes at least one of the control operation that increases the frequency of the compressor 1, the control operation that reduces the opening degree of the expansion device 4, and a control operation that closes the oil regulating valve 8A.

The refrigerating machine oil in step S13 is in a state in which although the concentration of the refrigerating machine oil is high and appropriate, the oil level is extremely high. This state indicates that there is an excessive amount of refrigerating machine oil with respect to the amount of refrigerating machine oil required for lubrication of the compression mechanism 23. Thus, the controller 50 executes at least one of the control operations, thereby reducing the amount of refrigerating machine oil returned to prevent a further increase in oil level. Note that the oil regulating valve 8A is closed to store excess refrigerating machine oil discharged from the compressor 1 in the oil separator 7.

In step S13, by closing the oil regulating valve 8A, the amount of refrigerating machine oil returned can be reduced with high efficiency. This is because a large part of the refrigerating machine oil discharged from the compressor 1 is stored in the oil separator 7. Accordingly, in step S13, the controller 50 may execute the control operation that closes the oil regulating valve 8A and, depending on the situation, may additionally execute the control operation that increases the frequency of the compressor 1 and the control operation that reduces the opening degree of the expansion device 4.

[Advantageous Effects of Refrigeration Cycle Apparatus 102 According to Embodiment 2]

The refrigeration cycle apparatus 102 according to Embodiment 2 have the same advantageous effects as those of the refrigeration cycle apparatus 100 according to Embodiment 1.

Embodiment 3

Figure 12:
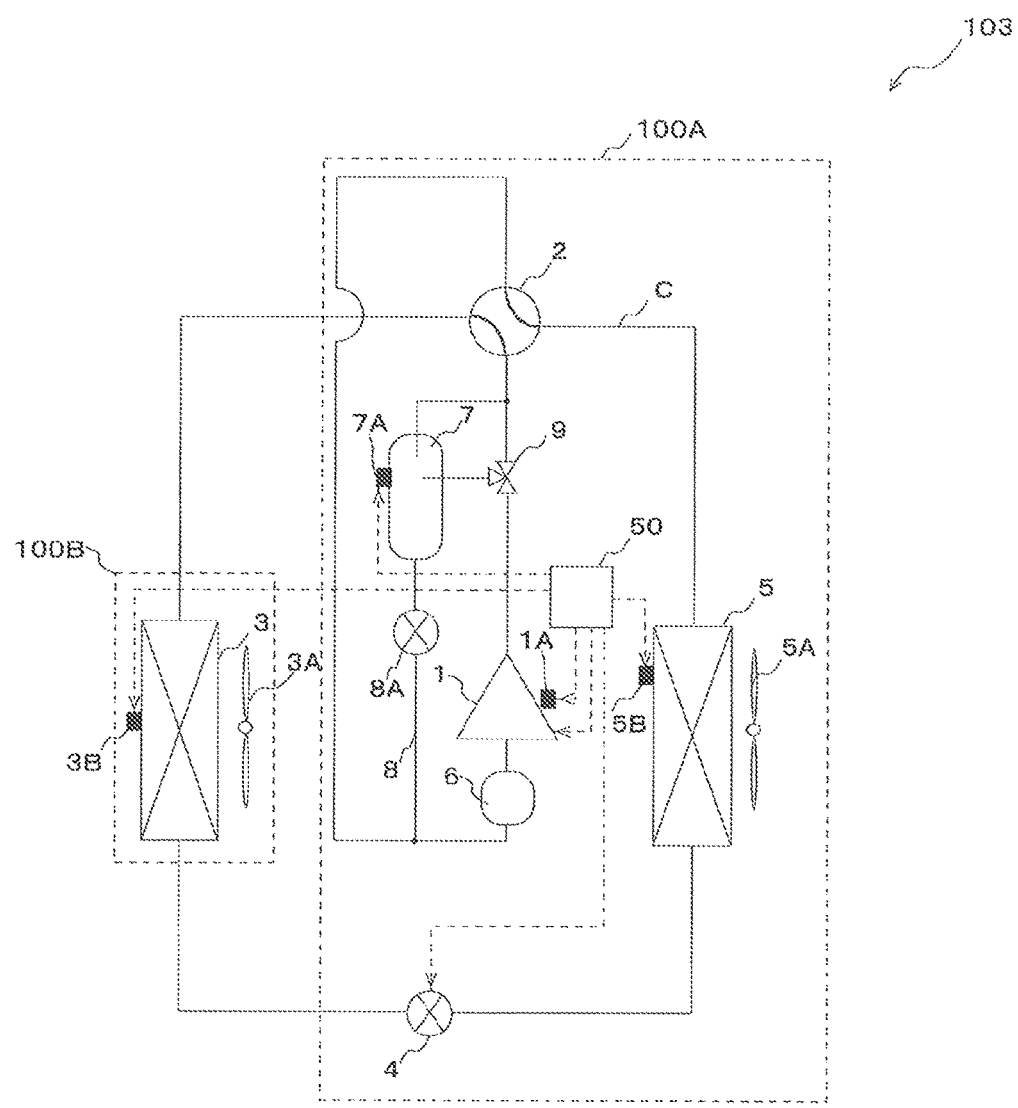
FIG. 12 illustrates an exemplary refrigerant circuit configuration of a refrigeration cycle apparatus 103 according to Embodiment 3 of the present invention.
Figure 13:
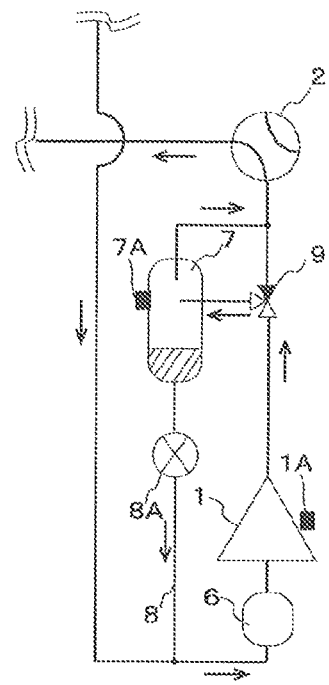
FIG. 13 illustrates a state in which refrigerant discharged from a compressor 1 is supplied to a condenser via an oil separator 7.
Figure 14:
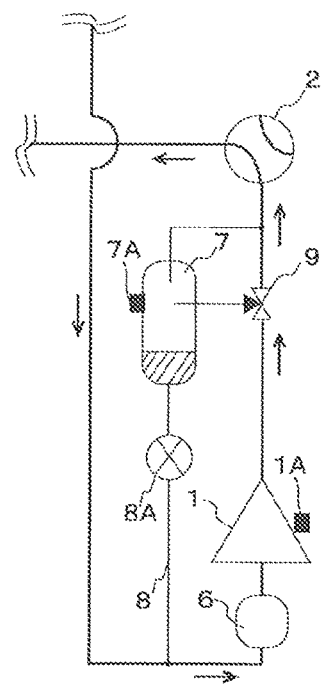
FIG. 14 illustrates a state in which refrigerant discharged from the compressor 1 is directly supplied to the condenser, not via the oil separator 7.

FIG. 12 illustrates an exemplary refrigerant circuit configuration of a refrigeration cycle apparatus 103 according to Embodiment 3. FIGS. 13 and 14 are explanatory diagrams illustrating a compressor 1 of a refrigerant circuit C of the refrigeration cycle apparatus 103 and its vicinity according to Embodiment 3. More specifically, FIG. 13 illustrates a state in which refrigerant discharged from a compressor 1 is supplied to a condenser via an oil separator 7, and FIG. 14 illustrates a state in which refrigerant discharged from the compressor 1 is directly supplied to the condenser, not via the oil separator 7. Note that FIGS. 12 to 14 illustrate a state in which a heating operation is performed, and therefore the condenser corresponds to an indoor heat exchanger 3. In Embodiment 3, elements common to Embodiments 1 and 2 are denoted by the same reference signs, and the following description will focus on the differences from Embodiments 1 and 2.

[Configuration of Refrigeration Cycle Apparatus 103]

First, the configuration of the refrigeration cycle apparatus 103 according to Embodiment 3 will be described.

The refrigeration cycle apparatus 103 according to Embodiment 3 further includes an oil separation switching valve 9 that is connected to the refrigerant discharge side of the compressor 1 and the oil separator 7 and that switches whether to connect the compressor 1 and the condenser via the oil separator 7.

The oil separation switching valve 9 is connected to the refrigerant discharge side of the compressor 1, the oil separator 7, and the condenser (the indoor heat exchanger 3 or an outdoor heat exchanger 5) via a flow switching device 2. If the refrigeration cycle apparatus 103 does not include the flow switching device 2, the oil separation switching valve 9 is directly connected to the condenser.

A controller 50 of the refrigeration cycle apparatus 103 according to Embodiment 3 is configured to control the frequency of the compressor 1, the opening degree of an expansion device 4, the opening degree of an oil regulating valve 8A, and connection of the oil separation switching valve 9, based on the concentration of the refrigerating machine oil in the compressor 1 and the oil level of the refrigerating machine oil in the compressor 1.

[Control of Refrigeration Cycle Apparatus 103]

Figure 15:
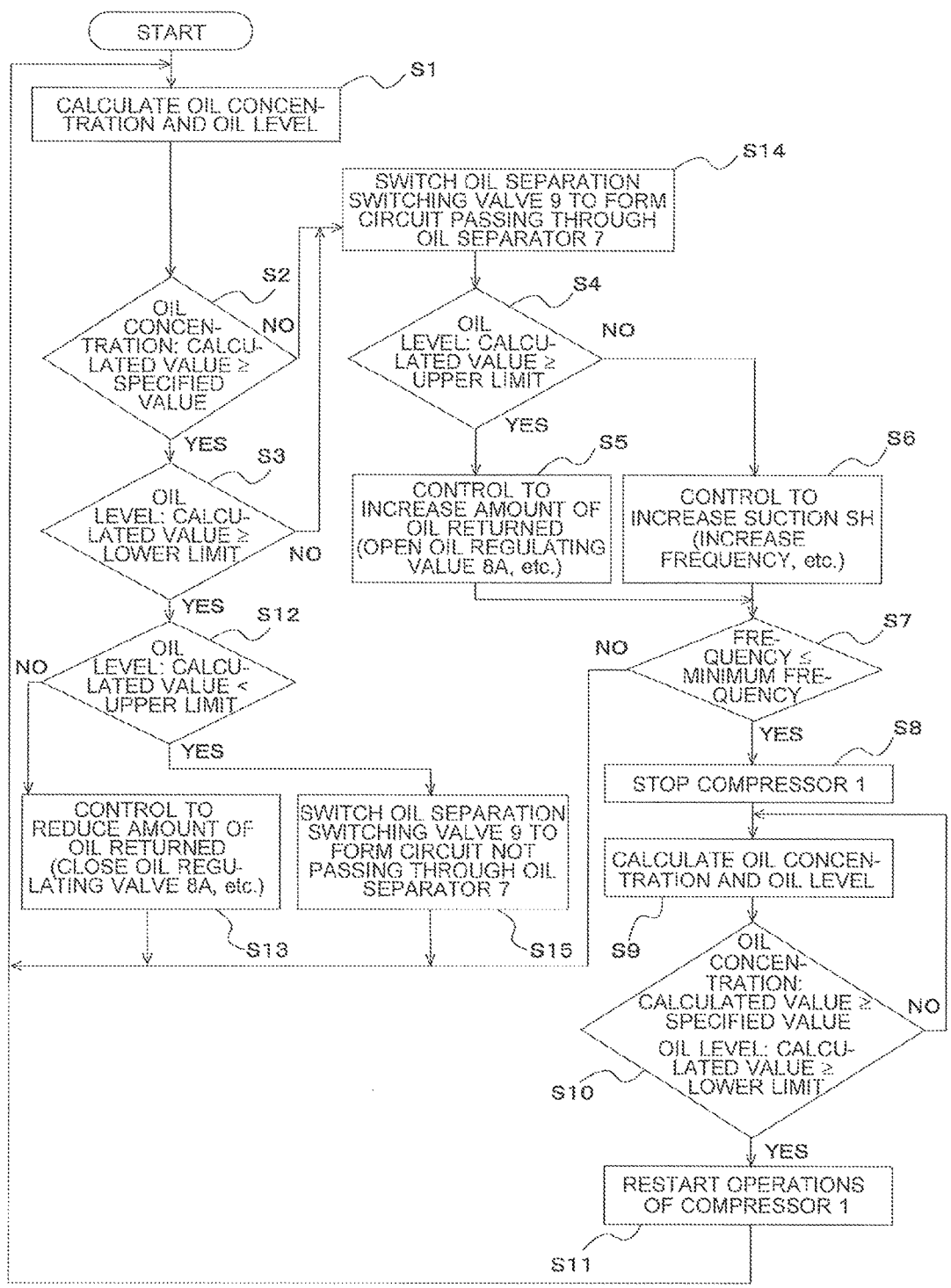
FIG. 15 illustrates an exemplary control flowchart of the refrigeration cycle apparatus 103 according to Embodiment 3 of the present invention.

FIG. 15 illustrates an exemplary control flowchart of the refrigeration cycle apparatus 103 according to Embodiment 3. In the following, the control of the refrigeration cycle apparatus 103 according to Embodiment 3 will be described.

In Embodiment 3, steps S14 and S15 are newly added, compared to Embodiment 2. First, step S14 and steps S5 and S6 after step S14 will be described.

(Step S14)

If the concentration of the refrigerating machine oil is less than the specified concentration (through step S2), or if the concentration of the refrigerating machine oil is greater than or equal to the specified concentration and the oil level is less than the lower limit (through steps S2 and S3), the controller 50 executes the following control. That is, the controller 50 switches the connection of the oil separation switching valve 9 to connect the compressor 1 and the condenser via the oil separator 7.

(Step S5)

If the oil level of the refrigerating machine oil is less than the upper limit, the controller 50 executes the control operation that increases the amount of refrigerating machine oil returned. That is, the controller 50 executes at least one of the control operation that reduces the frequency of the compressor 1, the control operation that increases the opening degree of the expansion device 4, and the control operation that increases the opening degree of the oil regulating valve 8A. The control content is the same as that of step S5 of Embodiment 2.

In Embodiment 3, unlike Embodiment 2, if the determination is NO in step S3, the process does not directly move to step S5. In Embodiment 3, if the determination is NO in step S3, the process moves to step S14.

(Step S6)

If the oil level is greater than or equal to the upper limit, the controller 50 executes at least one of the control operation that increases the frequency of the compressor 1 and the control operation that reduces the opening degree of the expansion device 4. This step S6 is the same as step S6 of Embodiment 2.

Next, step S15 will be described. Step S15 is a control operation that is executed if the concentration of the refrigerating machine oil and the oil level in the compressor 1 are appropriate.

If the concentration of the refrigerating machine oil is greater than or equal to the specified concentration and the oil level of the refrigerating machine oil is within a range greater than or equal to the lower limit and less than the upper limit, the controller 50 executes the following control. That is, the controller 50 switches the connection of the oil separation switching valve 9 to connect the compressor 1 and the condenser not via the oil separator 7. The refrigerant is transported without passing through the oil separator 7, and therefore it is possible to reduce a decrease in refrigerant flow rate in the refrigerant circuit C.

[Advantageous Effects of Refrigeration Cycle Apparatus 103 According to Embodiment 3]

The refrigeration cycle apparatus 103 according to Embodiment 3 have the same advantageous effects as those of the refrigeration cycle apparatus 102 according to Embodiment 2.

The invention claimed is:

1. A refrigeration cycle apparatus comprising:
a refrigerant circuit including a compressor, a condenser, an expansion device, and an evaporator, the compressor including a sealed container, a compression mechanism disposed in the sealed container, and a motor mechanism disposed in the sealed container, the motor mechanism being positioned above the compression mechanism in the sealed container and configured to drive the compression mechanism;
a first detector disposed in the compressor and configured to detect a temperature of the compressor, the first detector including a first temperature detector, a second temperature detector, and a third temperature detector, the first temperature detector being disposed in a first height position under the compression mechanism, the second temperature detector being disposed in a second height position corresponding to a bottom portion of the motor mechanism, the third temperature detector being disposed in a third height position above the motor mechanism;
a second detector provided between the compressor and the expansion device in the refrigerant circuit, and configured to detect one of a temperature of refrigerant and a pressure of the refrigerant;
an oil separator connected to a refrigerant discharge side of the compressor, and configured to separate a refrigerating machine oil from the refrigerant;
an oil return pipe connecting the oil separator and a refrigerant suction side of the compressor, and configured to return the refrigerating machine oil stored in the oil separator to the compressor;
an oil regulating valve provided in the oil return pipe, and configured to open and close a flow path of the oil return pipe;
an oil separation switching valve connected to the refrigerant discharge side of the compressor and the oil separator, and configured to switch to connect the compressor and the condenser via the oil separator and to connect compressor and the condenser not via the oil separator; and
a controller configured to control at least one of frequency of the compressor, an opening degree of the expansion device, an opening degree of the oil regulating valve, and connection of the oil separation switching valve, based on the temperature detected by the first detector and one of the temperature and the pressure detected by the second detector so as to maintain a concentration of the refrigerating machine oil dissolved in the refrigerant in the compressor and an oil level of the refrigerating machine oil in the compressor between the first height position of the first temperature detector and the second height position of the second temperature detector,
wherein the controller is further configured to:
when temperatures detected by the first temperature detector, the second temperature detector, and the third temperature detector are the same, calculate that the oil level is less than a lower limit corresponding to the first height position of the first temperature detector;
when the temperature detected by the third temperature detector is higher than the temperatures detected by the first temperature detector and the second temperature detector, calculate that the oil level is greater than or equal to an upper limit corresponding to the second height position of the second temperature detector; and
when the temperatures detected by the second temperature detector and the third temperature detector are higher than the temperature detected by the first temperature detector, calculate that the oil level is within a range greater than or equal to the lower limit and less than the upper limit.

2. The refrigeration cycle apparatus of claim 1, wherein the controller is configured to, when the concentration of the refrigerating machine oil is greater than or equal to a specified concentration and the oil level is greater than or equal to the upper limit, execute at least one of a control operation that increases the frequency of the compressor, a control operation that reduces the opening degree of the expansion device, and a control operation that closes the oil regulating valve.

3. The refrigeration cycle apparatus of claim 1, wherein the controller is configured to, when the concentration of the refrigerating machine oil is less than a specified concentration, or when the concentration of the refrigerating machine oil is greater than or equal to the specified concentration and the oil level is less than the lower limit, switch the connection of the oil separation switching valve to connect the compressor and the condenser via the oil separator.

4. The refrigeration cycle apparatus of claim 3, wherein the controller is configured to, when the oil level is greater than or equal to the upper limit, execute at least one of a control operation that increases the frequency of the compressor and a control operation that reduces the opening degree of the expansion device.

5. The refrigeration cycle apparatus of claim 3, wherein the controller is configured to, when the oil level is less than the upper limit, execute at least one of a control operation that reduces the frequency of the compressor, a control operation that increases the opening degree of the expansion device, and a control operation that increases the opening degree of the oil regulating valve.

6. The refrigeration cycle apparatus of claim 1, wherein the controller is configured to, when the concentration of the refrigerating machine oil is greater than or equal to a specified concentration and the oil level of the refrigerating machine oil is within the range greater than or equal to the lower limit and less than the upper limit, switch the connection of the oil separation switching valve to connect the compressor and the condenser not via the oil separator.

7. The refrigeration cycle apparatus of claim 4, wherein the controller is configured to:

when the frequency of the compressor is less than or equal to a minimum frequency of the compressor, temporarily stop operations of the compressor; and when the concentration of the refrigerating machine oil is greater than or equal to a specified concentration, and the oil level is greater than or equal to the lower limit, restart operations of the compressor.

* * * * *